Jan. 24, 1956  J. F. MILLIQUET  2,731,779
MACHINE FOR THE PRODUCTION OF BAGS CONTAINING
A SUBDIVIDED, PULVERULENT OR GRANULAR PRODUCT
Filed Dec. 6, 1951  9 Sheets-Sheet 1
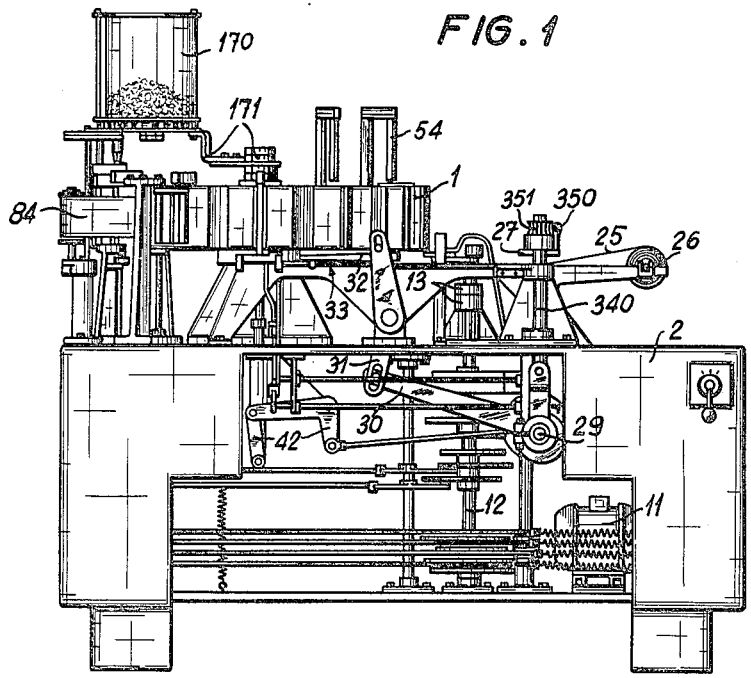
INVENTOR:
JACQUES F. MILLIQUET
BY:

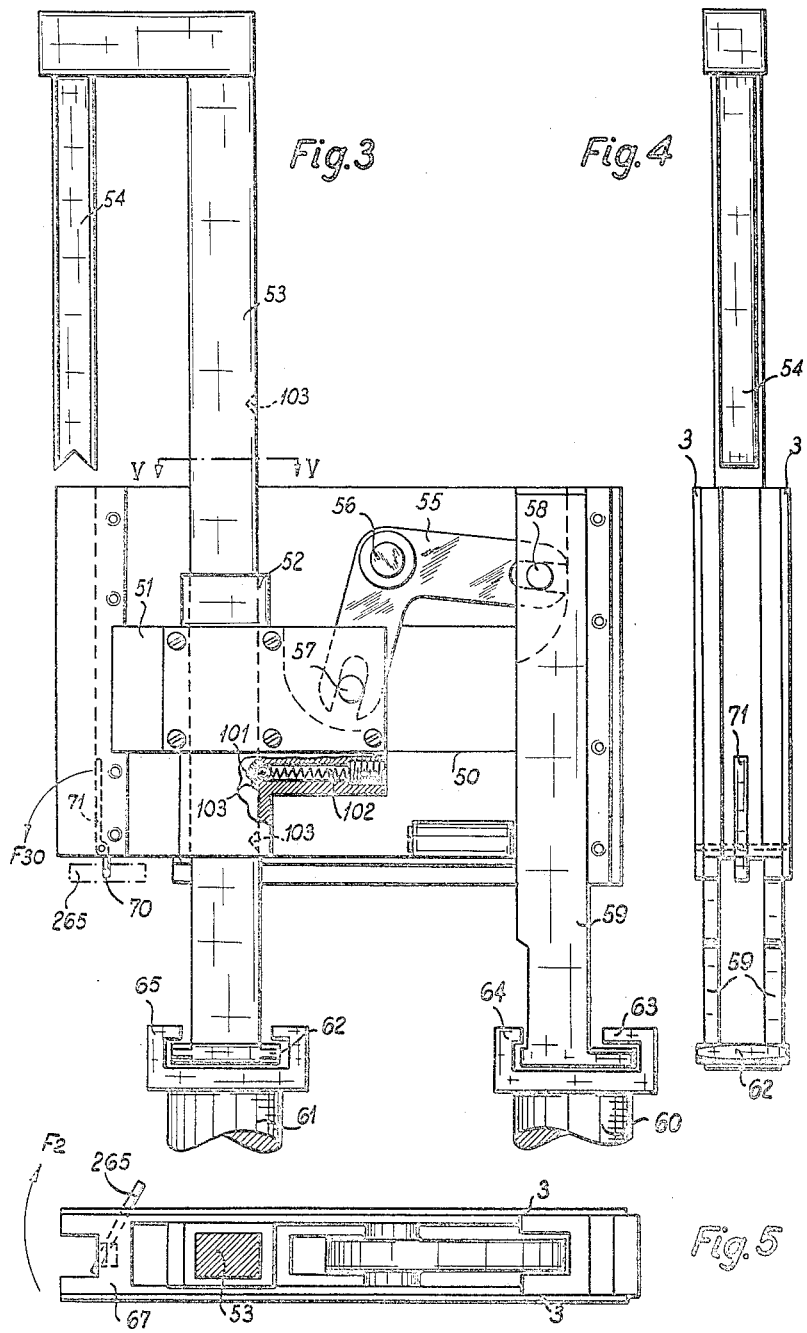

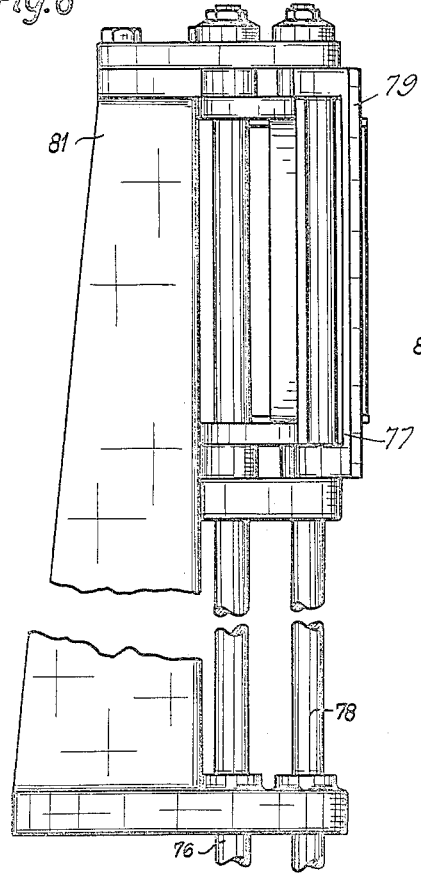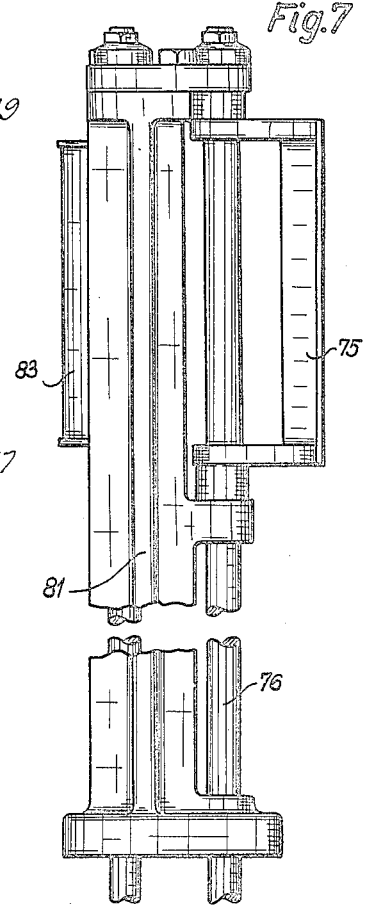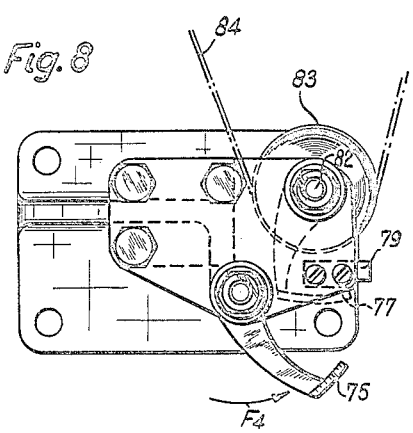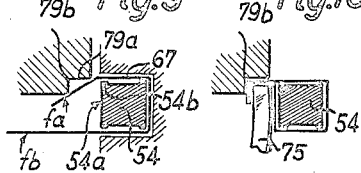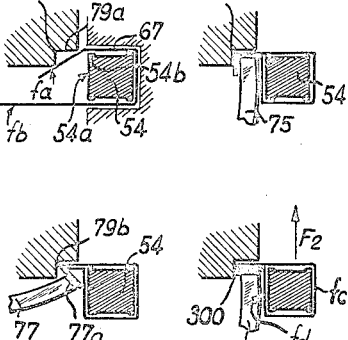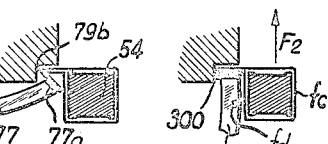
INVENTOR:
JACQUES F. MILLIQUET

INVENTOR:
JACQUES F. MILLIQUET

Jan. 24, 1956  J. F. MILLIQUET  2,731,779
MACHINE FOR THE PRODUCTION OF BAGS CONTAINING
A SUBDIVIDED, PULVERULENT OR GRANULAR PRODUCT
Filed Dec. 6, 1951  9 Sheets-Sheet 6
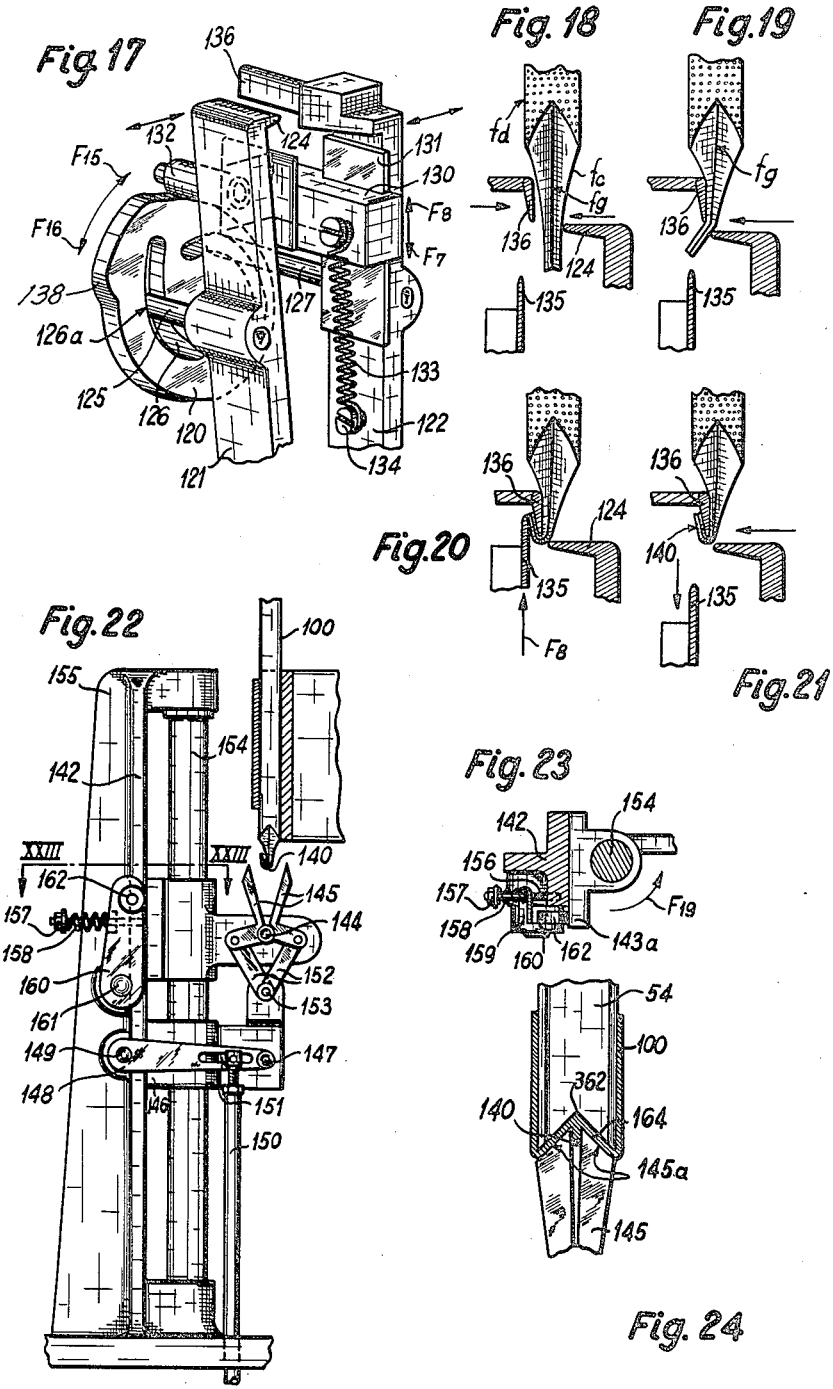
INVENTOR:
JACQUES F. MILLIQUET
BY:

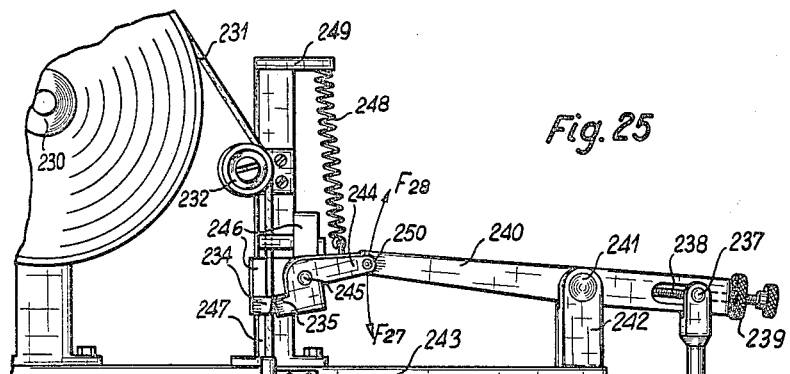

INVENTOR:
JACQUES F. MILLIQUET

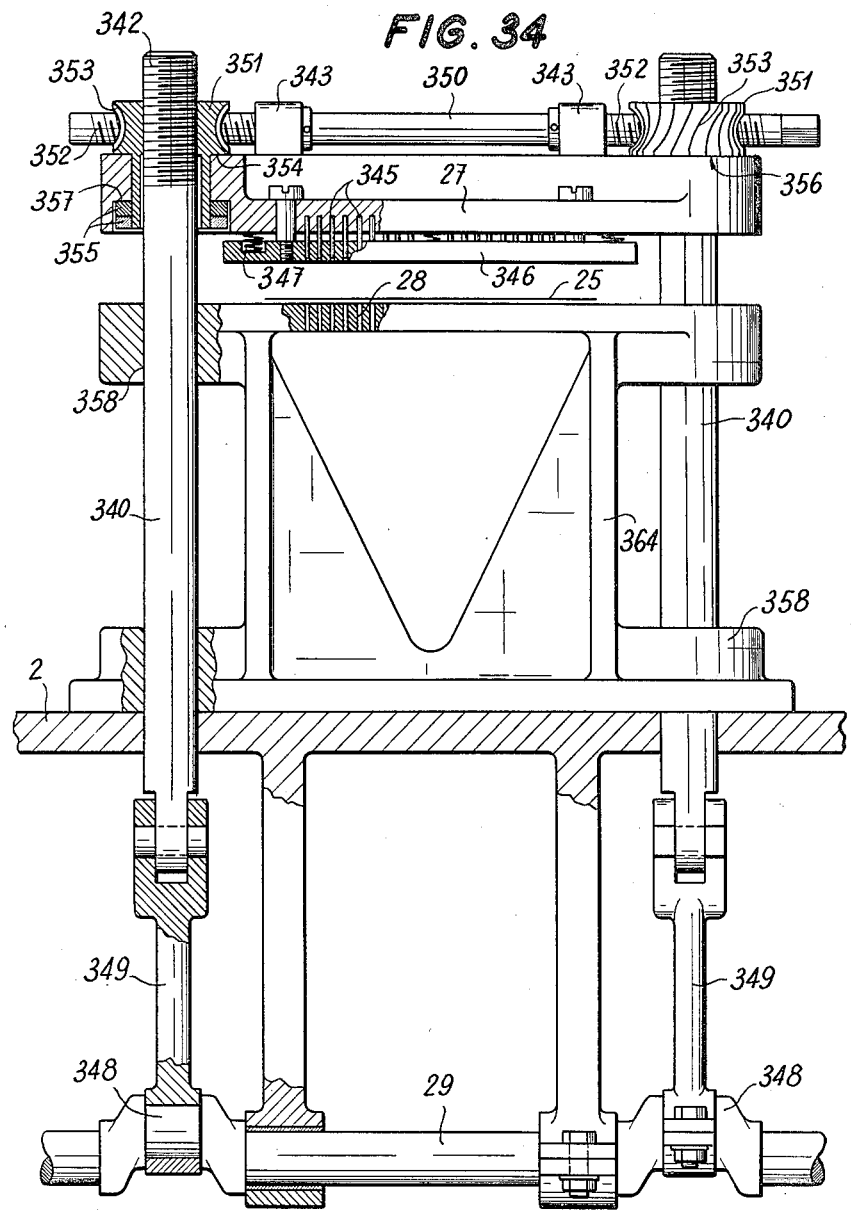

United States Patent Office 2,731,779
Patented Jan. 24, 1956

2,731,779
MACHINE FOR THE PRODUCTION OF BAGS CONTAINING A SUBDIVIDED, PULVERULENT OR GRANULAR PRODUCT

Jacques F. Milliquet, Lausanne, Switzerland

Application December 6, 1951, Serial No. 260,266

Claims priority, application Switzerland September 28, 1951

10 Claims. (Cl. 53—70)

My invention has for its purpose a machine for the production of bags having a generally prismatic shape, obtained preferably through the folding of a strip of thin metal foil.

My invention has for its object the automatic production of bags of this type, that are reinforced by means of a longitudinal closing rib and provided with a reentrant dihedral-shaped bottom.

A further object of my invention consists in producing a machine ensuring the automatic filling of the bag with a subdivided product and the closing thereof, said machine including also a device for affixing to the upper end of each bag a reference label.

A still further object of my invention consists in providing a perforating device including a punch the stroke of which is adjustable, said perforating device being adapted to perforate the bag in any desired manner in the case where it contains products that are intended for the preparation of tea or the like infusions or beverages.

Further objects and advantages of my invention will appear in the reading of the following description made with reference to accompanying drawings, wherein:

Fig. 1 is an elevational view of a preferred embodiment of the machine according to my invention.

Fig. 2 is a plan view thereof as seen from above.

Figs. 3, 4 and 5 are respectively an elevational view of the device adapted to carry the blank of the bag through the different operative steps, a view taken endwise of the outside of a revoluble drum adapted to shift the bag blank in succession into register with the different devices in which the different operative stages are to be performed and a horizontal cross-section through line V—V of Fig. 3, said Figs. 3, 4 and 5 showing the guiding plates and the control mechanism for the support to which is secured the movable blank-folding former.

Figs. 6, 7 and 8 show a second device that serves for folding the sides of the bag, respectively in front view, in side view and in plan view as seen from above.

Figs. 9 to 12 illustrate diagrammatically the successive steps of the folding operation executed on the sides of the bag, including the obtention of the longitudinal reinforcing rib.

Figure 13:
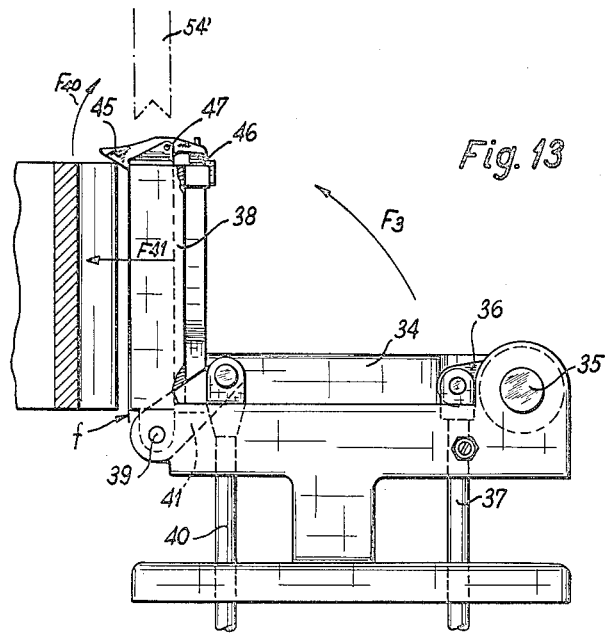
Figure 14:
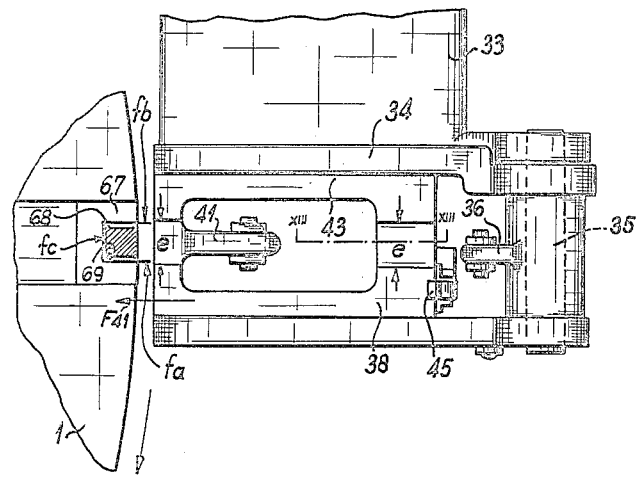

Figs. 13 and 14 are an elevational and a plan view of the device that serves for cutting a strip into blanks for the execution of the bag, and of a pressing frame.

Figs. 15 to 21 show the device used for the preliminary formation of the bottom of the bag.

Figure 15:
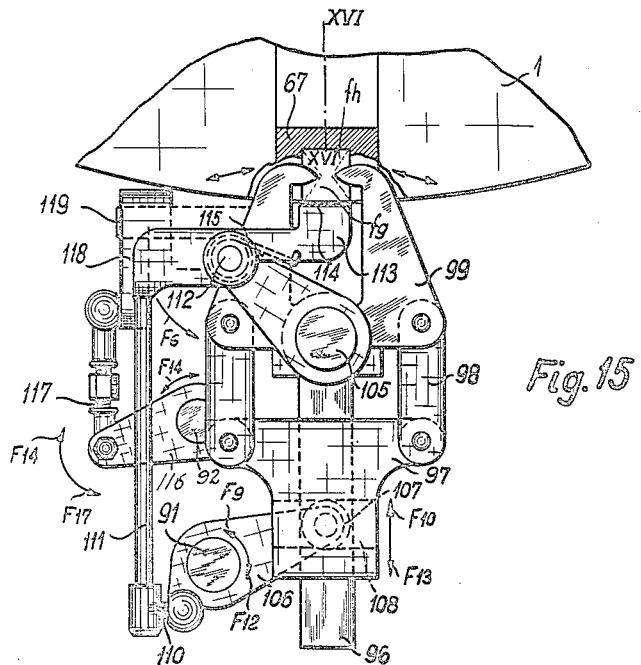

Fig. 15 is a plan view from above.

Figure 16:
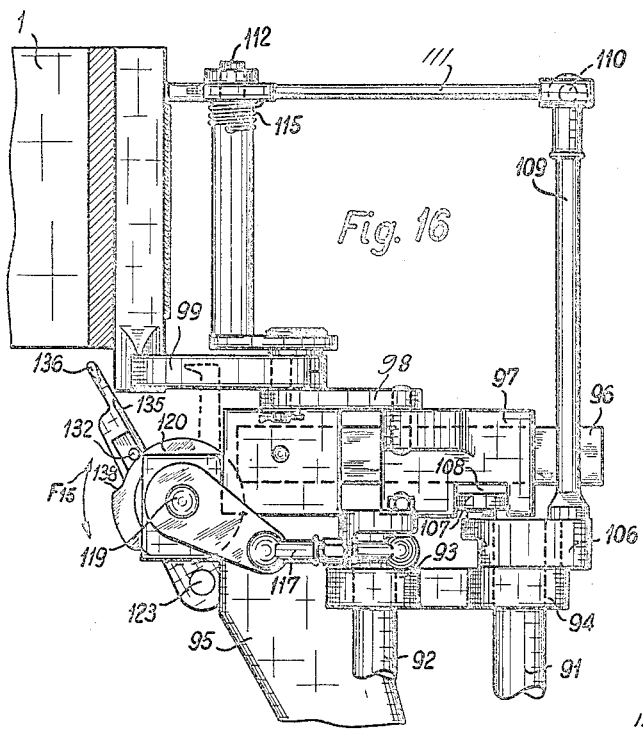

Fig. 16 is a projection on a vertical plane parallel to a radial plane of symmetry passing through the line XVI—XVI of Fig. 15.

Fig. 17 is a perspective view of the upper portion of the same device as seen from the side opposed to the plane of Fig. 16.

Figs. 18 to 21 illustrate the successive stages in the making of a temporary ribbed bottom.

Fig. 22 is an elevational view of a further device that is intended for finishing the bottom of the bag.

Fig. 23 is a cross-section through line XXIII—XXIII of Fig. 22.

Fig. 24 illustrates, on a larger scale, the last stage in the making of the final reentrant bottom of the bag.

Fig. 25 is an elevational view of a device adapted to close the bag and to introduce a label into the upper portion of said bag.

Figs. 26 and 27 are horizontal cross-sections respectively through lines XXVI—XXVI and XXVII—XXVII of Fig. 25.

Figs. 28 and 29 are diagrammatic plan views illustrating the operation of certain parts of the device illustrated in Figs. 25 to 27.

Figure 30:
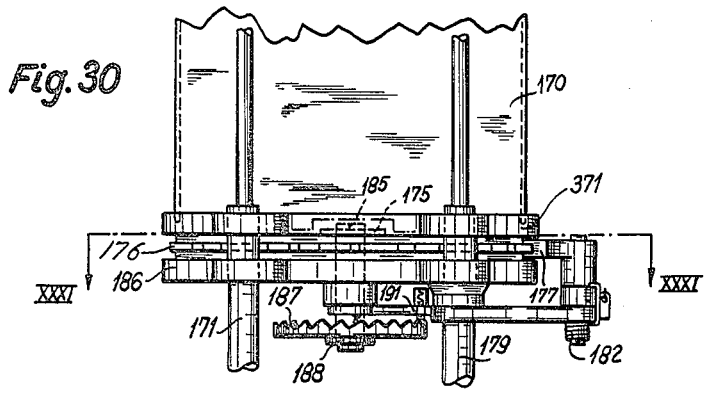
Figure 31:
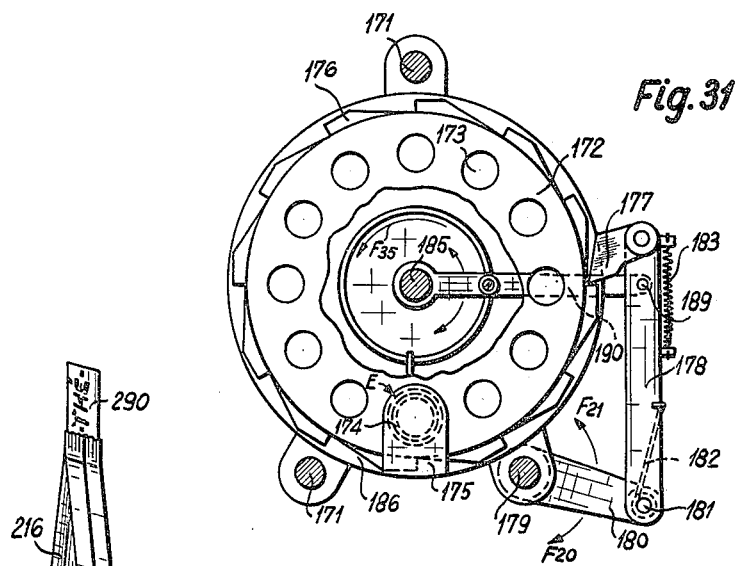

Figs. 30 and 31 are respectively an elevational view and a horizontal cross-section through line XXXI—XXXI of Fig. 30, illustrating the bag-filling device.

Figure 32:
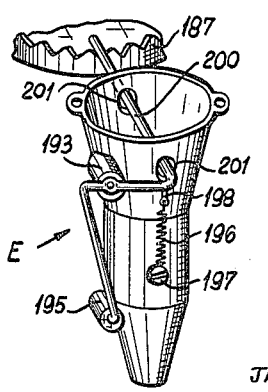

Fig. 32 is a perspective view of the funnel used for filling purposes, said funnel being shown dismantled with its associated vibrating means.

Figure 33:
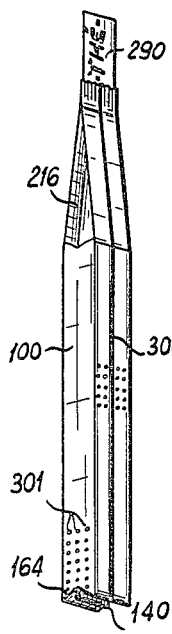

Fig. 33 is a perspective view of the bag when finished.

Fig. 34 is an elevational large scale partly sectional view of the strip-perforating means, the cross-section being made through line XXXIV—XXXIV of Fig. 2.

The main member of the machine is a rotary drum 1 the vertical shaft of which is guided inside a step-bearing, not illustrated, carried by the frame 2.

This drum assumes an intermittent rotary movement and carries several pairs of parallel plates 3, arranged radially of the drum at equal distances from one another and alternating peripherally with notches 4 formed in the drum for driving the latter as will be disclosed hereinafter. Each of these pairs of plates comes in its turn into register with the following devices that are distributed round a portion of the periphery of the drum:

A first device 5 adapted to transfer the blank sheets of metal foil and to fold the sides of the bag, A second folding device 6 adapted to produce the longitudinal reinforcing rib of the bag, Two devices for producing the bottom of the bag, said devices being generally designated by the reference numbers 7 and 8, A device 9 for filling the bags, And a device for closing the filled bag, generally designated by the reference number 10.

The pivoting movement of the drum 1 is controlled by an electric motor 11 actuating a worm gear, that is not illustrated, and therethrough a vertical spindle 12, the upper end of which carries a double cam-operated clutch system 13 adapted to impart to a control pinion 14 an intermittent rotary movement that always assumes the same direction. Said pinion 14 meshes with a small pinion 15 the spindle of which is rigid with the crank arm 16 carrying a roller 17 at its outer end. The outline of the cams of the clutch system 13 is designed in a manner such that for each revolution of the spindle 12 assuming a continuous rotary movement, the pinion 14 carried by said spindle may be driven only during one half revolution, the second half revolution of the spindle 12 corresponding to an inoperative stage of the pinion 14. The ratio between the speeds of the pinions 14 and 15 is defined in a manner such that for each half revolution of the pinion 14, the pinion 15 driving the roller 17 executes exactly one revolution. The roller 17 carried along by the crank arm 16, starts from the drum-notch engaging position 17′ illustrated in Fig. 2, executes a complete revolution and returns into said starting position in which it stops for a short time. The roller 17 has a diameter equal to the breadth of a notch 4 in the drum. During its revolution in the direction of the arrow F–1, said roller 17 carries along with it in its rotation the drum 1 through an angle corresponding to the angular spacing between two successive notches 4. The spindle 12 carries a cam that is not illustrated and that provides for the intermittent reciprocatory control of a rod 18 connected with a shoe 19 which acts in its turn on a brake drum 20 provided underneath the drum 1. This braking system becomes operative at the end of each intermittent angular movement of the drum 1 in order to damp gradually the kinetic energy of the latter.

A rocking arm 22 carried by a spindle 23 and controlled by a cam rigid with the spindle 12 carries at its end remote from the latter a stop 24 that enters the position illustrated in Fig. 2 at the end of each intermittent stroke of the drum 1 so as to define exactly the position in which the latter stops, in cooperation with the side of the notch 4 engaged by the roller 17.

The bags are executed starting from a thin strip of aluminium foil 25 wound over a feed drum 26. The strip 25 passes between the punch 27 and the stationary die 28 of a perforating mechanism.

The punch body 27 of the perforating mechanism (see Fig. 34) moves slidingly over the vertical uprights 340 through the agency of nuts 351 meshing with the upper threaded ends 342 of said uprights 340. An adjusting rod 350 adapted to rock in bearings 343 rigid with the punch body 27 is provided with two threaded sections 352 meshing each with helical teeth 353 formed at the outer periphery of the corresponding nut 351. A shoulder 354 on each of said nuts and an abutment ring 355 in contacting relationship respectively with the upper and with the lower bearing surface 356 and 357 provided at the corresponding end of the punch body 27 transmit the axial shifting of the nut 351 vertically over the corresponding upright 340 to the punch body 27. Hand-rotation of the threaded rod 350 produces a screwing or unscrewing of the nuts 351 with reference to the uprights 340 and consequently this leads to a sinking or to a rising movement of the punch carrier 27. The actual perforating punches 345 carried by the punch body 27 are adapted to cooperate with corresponding openings formed in the stationary die 28. A bearing plate 346 carried by vertical guides and held in its inoperative position at a predetermined distance underneath the punch body 27 by springs 347 engages during the perforating operation, the aluminium or the like strip 25 extending over the die 28.

The vertical movements of the uprights 340 are controlled by means of two connecting rods 349 controlled in their turn through the cranks 348 by the camshaft 29. Said uprights 340 are guided in the vertical bearings 358 of an auxiliary frame 364. When the punch body 27 is lowered, the operative fraction of its downwardly directed stroke during which it cooperates with the die 28 increases in length. In contradistinction, said operative fraction may be reduced or even cut out entirely if the punch body 27 is sufficiently raised. In this latter case, the strip 25 is not perforated.

The camshaft 29 controlling the punch carries a further eccentric plate connected through a connecting rod 30 with the transmission arm 31 of a feed device including a pressure plate 32 assuming a translational movement from the right hand side to the left hand side of the machine, as seen in Fig. 1, with a view to shifting the aluminium strip 25 forwards. During its return movement towards the right hand side of Figs. 1 and 2, said plate 32 is raised above the race 33 over which the sheet of aluminium is fed.

A rectilinear projection 34 acting as a stop is adapted to engage the strip 25 near the left hand side of the race 33. Turning to Figs. 13 and 14, it is apparent that this projection 34 is rigid with a hub adapted to rotate round a spindle 35. Said hub is rigid with a crank arm 36 pivotally secured to the connecting rod 37 transmitting movement to the hub. A transfer frame 38 is adapted to pivot round a horizontal spindle 39 parallel with the direction of progression of the aluminium strip. Said frame 38 is controlled, through the system including the connecting rod 40 and a crank arm 41, by the camshaft 29 acting through the agency of a leverage 42. The rectangular periphery of the pressing frame 38 corresponds in size with the rectangular blank that is cut out of the aluminium sheet 25 at the beginning of the operation of said frame. In order to provide for this cutting out of the sheet, the edge of the frame 38 that is nearest the projection or stop 34 in its lower position, assumes the shape of a cutting edge 43 adapted to shear the strip 25 in cooperation with the end of the race 33, over which the strip of aluminium is fed, and the projection 34, said race and projection holding fast between them the aluminium strip 25 while it is being sheared by the movable cutting edge 43. The pressing frame 38 is provided at the end opposed to the horizontal spindle 39 round which it rocks with a pawl 45 submitted to the action of a spring 46 and terminating with a nose adapted to hold fast one of the edges of the rectangular sheet $f$ cut out of the aluminium strip, when the frame 38 is caused to pivot in the direction of the arrow F–3 in order to prevent the sliding and dropping of said cut sheet. When the frame 38 has entered its vertical position illustrated in Fig. 13, the pawl 45 engages the upper edge of the drum 1 whereby its nose releases the aluminium sheet through a clockwise rocking of the catch 45 round its spindle 47.

The pairs of plates 3 fitted in the radial grooves of the drum 1 are made of metal and carry in the vicinity of the periphery of the drum a die 67 made of fibre. Each of these pairs of plates is provided with horizontal guiding slideways 50 in which is guided a slider 51 provided with a vertical guide 52 for a supporting upright 53 carrying a shaping former 54 that is parallel to said upright (Figs. 3, 4 and 5). The horizontal movements of the slider are controlled by a bell crank 55 adapted to rock round a stationary spindle 56 and the ends of which engage respectively a cross member 57 on the slider 51 and a transverse rod 58 rigid with a control bar 59 the vertical reciprocating movements of which are produced by the push members 60 thus controlling the sliders 51. The vertical reciprocating movements of the supporting upright 53 and consequently of the former 54 are controlled by peripheral push members 61 parallel with the push members 60 controlling the slider 51. The lower end of the upright 53 is provided with a shoulder 62 and similarly, the lower end of the control bar 59 is provided with a shoulder 63 extending radially with reference to the drum 1. These shoulders 62 and 63 are adapted to cooperate with the driving straps 64 and 65 rigid respectively with the upper end of the push members 60 and 61, this arrangement being designed for the control of the downward strokes of the members 53 and 59. The slider 51 carries a stop 101 constituted by a ball urged by a spring 102 selectively into one of the notches 103 provided in a plane surface of the sliding upright 53. Said ball 101 engages yieldingly one of said notches 103 so as to define the different vertical positions to be assumed by the upright 53 carrying the former 54.

The first device positioned near the drum 1, which device is to transfer the bag blanks and to fold the sides of the bag, includes: the pressing frame 38 provided with a pawl 45 and auxiliary means for holding the upper end of the blank, the peripheral push member 61 and the slider push member 60 which latter are both controlled by the horizontal camshaft 29, the device including further the former 54 and the die 67 that lie during the stopping of the drum in the vertical plane of symmetry of the pressing frame 38.

This arrangement operates as follows: the former 54 is first located above the drum on a vertical line passing between the die 67 and the drum axis. Under the action of the slider push member 60 and of its strap 64 executing a downward movement, the former 54 moves away from the drum axis and enters the position 54′ illustrated in dot-and-dash lines in Fig. 13. At the same time, the pressing frame 38 pivots in the direction F-3 round the axis 39 under the control of the connecting rod 40, so as to shift a rectangular blank of aluminium foil $f$ against the periphery of the drum, after which the former 54 sinks vertically as provided by the downward stroke of the push-member 61 and the strap 65 engaging the shoulder 62. Towards the end of the blank-pressing movement of the frame 38, the pawl 45 engages through its left hand side (Fig. 13) the upper edge of the drum and, at the end of this rising movement of the frame 38, the pawl 45 rocks in the direction of the arrow F-40 so as to release the upper edge of the blank $f$. This being done, the former 54 sinks vertically along the outer surface of the blank $f$ with reference to the drum, a recess $e$ being provided for this purpose in the frame 38. As soon as this sinking movement is finished, the push member 60 begins to rise and the former consequently travels in the direction of the arrow F-41 towards the drum axis; this push member depresses then the medial portion of the blank $f$ inside the die 67 into the bottom of the latter. At the same time, the pressing frame 38 is rocked back into its horizontal position in a direction opposed to the arrow F-3. The depression of the former 54 inside the die 67 produces a folding of the blank $f$ along two longitudinal parallel lines 68, 69 corresponding to two adjacent edges of the former 54. When the folding is finished, the sheet $f$ is provided with two lateral flaps, $fa$, $fb$, connected through a rear surface $fc$, of the bag that is in the making (Fig. 14). This being done, the drum executes a partial rotation in order to provide for the beginning of a further cycle of operations in the same manner with a further blank $f$.

Each die 67 carries at its lower end a blank-extracting catch 70 that normally lies in its inoperative retracted position inside a recess 71 while it is adapted to rock round an axis 72; the part played by this catch 70 will be disclosed hereinafter.

The second folding device 6 of the machine includes, as illustrated in Figs. 6 to 12, a first jaw 75 carried by a vertical spindle 76 and a second jaw 77 carried by a second spindle 78, said spindles being adapted to rock round their vertical axes. This device includes, further, a stationary vertical angle bar 79 forming a stop and one flange 79a of which lies substantially in alignment with a side wall of the die 67 when the drum is stationary. The inner edge 79b of the reentrant angle of 90° formed by the angle bar 79 is located at a distance from the front wall 54a of the former 54 that is substantially equal to one half of the breadth of this wall 54a. The frame 81 of this folding device 6 carries a vertical spindle 82 on which is mounted a roller 83 that serves for guiding a holding strip 84. This strip is wound, furthermore, on the tensioning rollers 85, 86 and on a return roller 89 (Fig. 2). The tensioning rollers 85 and 86 are mounted respectively on the arms 87 and 88 that are rigid with vertical spindles, said arms being adapted to modify the tension with which the strip 84 is wound over the system of rollers. The strip 84 is urged against a portion of the periphery of the drum 1 extending substantially from the notch 4 adjacent the second folding device, up to a point beyond the closing device 10 in the direction of rotation F-2 of the drum. Said strip serves for holding the bag inside the die 67 during the operative steps providing for the formation of the bottom, the filling and the closing of the bag.

The operation of this second folding device is as follows: when the former 54 and the blank $f$ that has been submitted to its first folding and is provided with its two parallel flaps $fa$, $fb$ arrives in register with the second device, the flap $fa$ is submitted to an elementary folding round the edge 54b of the former 54 towards the end of the intermittent progression of the drum (see Fig. 9). Immediately afterwards, the first jaw 75 rocks in the direction of the arrow F-4 round its spindle 76 so as to urge the two flaps $fa$ and $fb$ of the sheet inside the reentrant angle of the angle bar 79 which has for its result to fold a double thickness of the blank through an angle of 90° into the inner edge 79b of the angle bar 79 (Fig. 10). A rocking in the direction opposed to the arrow F-4 returns the first jaw 75 out of the angle bar 79 so that it occupies its inoperative position illustrated in Fig. 8.

The second jaw 77, becomes then operative; it pivots with its spindle 78 until its front surface 77a comes into contact with the longitudinal edges of the blank sheet $f$ and folds the latter so as to form an acute dihedral ridge of which is located theoretically at the inner edge 79b of the angle bar or abutment 79, as illustrated in Fig. 11. This operative step serves for the preparation of the final folding of the edges of the sheet $f$ that is produced through a second operation performed by the first jaw 75. For this last operation, the jaw 75 rocks again in the direction of the arrow F-4 and folds completely back over one another the edges of the flaps $fa$ and $fb$ of the blank $f$. There is thus obtained a reinforcing rib 300 constituted by four superposed plies of the foil forming the blank (Fig. 12). After the first jaw has executed a rearward movement, the drum 1 executes a further rotation in the direction F-2 during the first portion of which the longitudinal reinforcing rib 300 is folded back against the front surface 54a of the former 54 by reason of the engagement therewith of the flange 79a of the stationary angle bar or abutment 79. The bag that is being made is thus provided throughout its fourth wall $fd$, with a longitudinal reinforcing rib 300. When the drum starts again moving in the direction of the arrow F-2, said rib is crushed against the wall $fd$ and made smooth through the action of the strip 84 and of the roller 83.

The third folding device 7 (Fig. 2) that serves for partly forming the bottom of the bag, includes two vertical control spindles 91—92 adapted to rock in either direction round their vertical axes as provided by a cam shaft located inside the frame 2 of the machine (Figs. 15 and 16). These rotary spindles 91 and 92 are held in bearings 93 and 94 of the stationary frame 95 of the machine (Figs. 15 and 16.) This frame 95 is provided with a slideway 96 having a rectangular cross-section the major axis of symmetry of which lies in a plane radial with reference to the drum 1 in which plane lie the main axes of the former 54 and of the die 67 when the drum stops in register with the device 7. This slideway 96 carries a slider 97 that is connected through the links 98 with a pair of lateral jaws 99 adapted to rock in a horizontal plane slightly underneath the lower surface of the drum 1. These jaws 99 are adapted to rock round a common stationary pivotal axis 105 (Fig. 15). The rotary spindle 91 carries an arm 106 provided with a roller 107 engaging a transverse groove 108 in the slider 97.

The movement-transmitting arm 106 carries at its end opposed to the roller 107, an upwardly directed rod 109 that is in contact, through a spherical part 110, with the longer bent arm 111 of a lever of the second order pivotally carried by a vertical spindle 112, while the shorter arm 113 of the said lever is provided at its outer end with a rough surface 114 adapted to engage the upper part of the fourth wall of the bag during its formation. A spring 115 urges the lever 111, 113 in the direction of the arrow F-6 round the spindle 112.

The rotary spindle 92 carries an arm 116 pivotally secured through a link 117 of adjustable length with a crank 118 keyed to a horizontal rocking spindle 119 carrying a cam 120 that is illustrated in perspective view in Fig. 17. On the side of the folding device that is opposed to the spindles 91 and 92 with reference to the above mentioned radial plane of symmetry, said device includes two further levers 121 and 122 adapted to rock independently of each other round a spindle 123, adapted to rock inside a bearing formed in the frame 95. The plane in which the levers 121 and 122 rock, is perpendicular to that of the lateral jaws 99. The upper end of the lever 121 includes a forming nose 124. A transverse rod 125 rigid with the lever 121 engages a guiding groove 126 in the cam 120 in a manner such that the rocking movement of the cam 120 provides controlled movements of the lever 121 through action on the spiral portion 126a of the groove 126 on said transverse rod. The lever 122 carries also a transverse rod 127 one end of which engages a second groove 128 in the cam 120, which groove constrains said lever 122 to rock under the action of the oscillations of the cam 120. A slider 130 is adapted to slide in a slideway 131 carried by the lever 122. Said slider 130 is provided with a roller 132 engaging the periphery of the cam 120; it is urged in the direction of the arrow F-7 through a substantially vertical tensioned spring 133 the lower end of which is secured by a screw 134 to the lever 122. The slider 130 is provided with a folding bar 135 (Fig. 6) while the upper end of the lever 122 carries a shaping bar 136 arranged in overhanging relationship thereon. The slideway 131 is angularly set in a direction such that the folding bar 135 is located to one side of the shaping bar 136 when the slider 130 rises in the direction illustrated by the arrow F-8.

The operation of this folding device is as follows: The rotary spindle 9 rocks first in the direction of the arrow F-9, whereby the slider 97 moves in the direction of the arrow F-10 and provides for the partial closing of the lateral jaws 99. The latter form, in the lower part of the two sides of the bag, two symmetrical grooves fg and fh, that begin forming underneath the V-shaped end of the former 54. This operative step has also for its result to urge towards each other the lower ends of the front walls fc and fd of the bag. The former 54 rises somewhat before the end of the closing movement of the lateral jaws 99 in order to define the vertical portion of the side walls fa and fb before the bottom of the bag is formed. At the end of the rocking movement of the arm 106 in the direction F-9, the rod 109 allows the lever 111, 113 to rock slightly in the direction F-6 under the action of the spring 115. The rough surface 114 at the end of the lever 111, 113 engages then the upper end of the bag wall and prevents the latter from following the rising movement of the former 54. The spindle 91 will now rock back in the direction F-12 and the slider 97 that is thus driven in the direction of the arrow F-13, produces a release of the jaws 99 that rock round the stationary spindle 105. After a short stoppage, the control spindle 92 rocks in the direction of the arrow F-14 which causes the cam 120 to rock in the direction of the arrow F-15. The parts of the grooves 126 and 128 of the cam 120 assuming the shape of almost rectilinear spiral lines act on the transverse rods 125 and 127 so as to produce a movement towards each other of the auxiliary levers 121 and 122. At the beginning of this movement of the levers, the shaping bar 136 engages the lower end of the front wall fd of the bag, while the nose 124 engages the opposite wall fc of the same bag (Fig. 18).

When the movement of the auxiliary levers 121 and 122 towards each other is at an end, it is apparent, as illustrated in Fig. 19, that the nose 124 has begun folding the lower ends of said walls fc and fd round the lower edge of the shaping bar 136. The cam 120 continues rotating in the direction of the arrow F-15 and its raised portion 138 raises the roller 132 whereby the slider 130 is constrained to rise in the direction of the arrow F-8; consequently, the folding bar 135 comes into engagement with the deflected ends of the walls fd and fc to fold them completely at 140 over the lower edge of the shaping bar 136 (see Fig. 20). The cam 120 rocks then in the opposite direction illustrated by the arrow F-16 so that the slider 130 may sink over the slideway 131 under the action of the spring 133. The bar 135 moves thus away from the rib 140 forming the temporary closure for the bottom of the bag (see Fig. 21). Before the spindle 92 rocking in the direction of the arrow F-17 has spaced apart the auxiliary levers 121 and 122, the drum 1 resumes its intermittent rotation through which the rib 140 of the bag is released laterally from the shaping bar 136, the fold of the wall fd of the bag sliding then over the bar 136.

The next folding device shown at 8 in Fig. 2 is intended to form the bottom of the bag. It includes a stationary carrier upright 155 (Fig. 22) provided with a vertical slideway 142 on which are mounted an upper slider 143 carrying a spindle 144 to which are pivoted the two finishing clamping jaws 145 and a lower slider 146 connected through the hinge 147 with a rocking arm 148 pivoting round a horizontal spindle 149. This arm 148 is controlled by a transmission rod 150 submitted to reciprocation by the cam-shaft 29. It is possible to adjust the magnitude of the vertical reciprocating movement of the slider 146 by shifting the terminal transverse projection on the rod 150 inside an elongated slot 151 provided in the arm 148. The finishing jaws 145 are connected through the links 152 with the transmission spindle 153 carried by the slider 146. The sliders 143 and 146 are guided over a cylindrical upright 154 mounted in the carrier upright 155. The upper slider 143 is provided with a flange 143a that extends beyond the slideway 142 (Fig. 23). A threaded rod 156 secured in the carrier upright 155 engages an adjusting nut 157 that serves for compressing to a varying extent a spring 158 against a lug 159 provided on a bearing lever 160, which latter is mounted on a pivot 161 rigid with the upright 155. This lever 160 is provided with a bearing roller 162 urged through the said spring 158 against the flange 143a of the slider 143. The bearing lever 160 produces through its roller 162 a torsional torque on the slider 143 in the direction of the arrow F-19 round the cylindrical upright 154, which brakes the movement of the slider 143 along the slideway 142.

The operation of this last described device is as follows: when a bag in the making stops within range of operation of the finishing jaws 145, the control rod 150 rises by an adjusted amount, whereby the lower slide 146 exerts an upwardly directed thrust on the spindle 153. By reason of the braking action to which the upper slide 143 is submitted, the latter remains at first stationary and the finishing jaws 145 close through a rocking movement round the stationary spindle 144. This closing movement of the jaws 145 provides a crushing between them of the walls forming the rib 140 that is still projecting beyond the lower end of the bag. When the jaws 145 are still fully clamped together, the control rod 150 continuing its upward movement, provides then for a rising movement of the two sliders 146, 143 that have become rigid with each other by reason of the clamping of the jaws 145. Consequently, the latter urge the rib 140 into the bottom of the V-shaped notch 362 provided at the lower end of the former 54 which has for its result the formation of a reentrant bottom or dihedral 164 for the bag 100 (Fig. 24). The front or outer surface 145a of the jaws 145 shows in the position apparent from inspection of Fig. 24, a certain obliquity corresponding to that of the sides of the V-shaped notch so that the bottom of the bag is shaped in an accurate manner.

During the last stage of the upward movement of the sliders 143, 146, the former 54 that has remained momentarily stationary so as to cooperate in the formation of the bottom of the bag, rises in its turn and is followed by the jaws 145 over a predetermined height of travel. Consequently, the whole bag is raised by the amount required for its upper portion assuming a rectangular cross-section to rise above the upper surface of the drum. This is necessary in order to allow the subsequent closing of the bag by means of members operating above the upper surface of the drum. After a stoppage that serves a purpose disclosed hereinafter, the former 54 rises alone so as to move entirely out of the die 67 after which it is urged horizontally towards the centre of the drum. It will be noticed that the jaws 145 that clamp strongly the rib 140, prevent the bag from following the former 54 during the second part of the upward movement of the latter.

When the transmission rod 150 begins its sinking movement, the braking action exerted on the upper slider 143 is less than during the upward movement of said slider. While the former 54 is stationary and remains in the position illustrated in Fig. 24, the jaws 145 that are released by reason of the downwardly directed tractional effort exerted on the links 152, are submitted to a reaction having a downwardly directed component by the sides of the notch 362 in the former that assumes the shape of an inverted V. This downwardly directed component furthers the downward movement of the upper slide 143.

The machine includes, beyond the folding devices considered in the direction of rotation of the drum 1, a device for filling the bag with a product in a subdivided state from a cylindrical glass container 170 provided with an annular rim 371 carried by a support 171 (Figs. 30 and 31). A thick round plate 172 forming a double bottom for the container 170 is provided with twelve cylindrical perforations 173 equidistant with reference to one another and adapted to come in succession into register with a stationary opening 174 provided in a carrier plate 186. These perforations 173 are sized so as to contain each the desired amount of product that is to fill one bag. The stationary opening 174 is centered round the same vertical axis as the filling funnel E secured to the support 171. The thick plate 172 is adapted to revolve round its axis over the carrier plate 186. The periphery of the thick plate 172 is provided with ratchet teeth 176 the straight edges of which may be engaged by a driving pawl 177 pivotally secured to a transmission rod 178. A shaft 179 controlled through one of the cam shafts of the machine, and adapted to assume a reciprocatory movement, carries a crank arm 180 pivotally connected at 181 with the said transmission rod 178. A spring 182 holds the rod 178 in correct angular relationship with reference to the ratchet teeth 176 and a vertically extending tensioned spring 183 urges the pawl 177 into the bottom of the intervals separating two successive ratchet teeth 176.

The annular rim 371 carries a closing plate 175 the lower surface of which is in contacting relationship with the double bottom plate 172 and closes selectively each of the perforations 173 when the latter registers with the stationary opening 174.

A pivot 185 mounted at the center of the carrier plate 186 on which the thick plate 172 rests, is provided at its lower end with a toothed ring 187 acting as an annular rack. This ring 187 rests over an axial abutment 188 and may revolve round the pivot 185. The transmission rod 178 is pivotally secured at 189 to a bar 190 revolubly mounted round the pivot 185. Said bar 190 carries a vertical spring-urged depressing member 191 that is held elastically in mesh with the rack 187.

The funnel E, secured through its larger base to the carrier member 171, is provided with a lateral bearing member 193 in which the axis of a vibrator may rock. Said vibrator assumes the shape of a lever with two arms bent in orthogonal planes and is provided with an impact stud 195 adapted to hit the lower part of the funnel E. A spring 196 is stretched between a securing screw 197 rigid with the funnel and a hook 198 secured to the substantially horizontal arm 200 of the svibrator near the bent portion thereof. Said arm 200 passes through perforations 201 provided in the funnel E; its free end is held in contact with the rack 187 through the action of the tractional spring 196.

The operation of this filling device is as follows: the driving spindle 179, rocking in the direction of the arrow F-20, controls the transmission rod 178 and the catch 177 so as to make the thick plate 172 rock through an angle equal to the angular spacing between two perforations 173. One of the latter, that is filled with the product filling the container 170, such as tea leaves e. g., is brought into register with the lower surface of the closing plate 175 and stops in its emptying position exactly in register with the round stationary opening 174 in the carrier plate 186. The tea leaves occupying the perforation 173 in its emptying position, may then drop into the funnel E and from the latter into the bag, the upper open end of which is now in exact register with the lower end of the funnel and remains there during the stoppage of the main drum 1. The tea leaves or any other subdivided granular or pulverulent product flows thus out of the container 170 and this flow is furthered by the vibration of the funnel E as provided by the vibrator 195—200. For this purpose, the rack-shaped ring 187 rotates in the direction of the arrow F-35 when the control shaft 179 rocks in the direction of the arrow F-21 while the bag is stationary. The arm 200 of the vibrator is then caused to vibrate through the associated action of the rack 187 and of the spring 196, whereby the impact member 195 hits the funnel E at a rapid rhythm.

During the subsequent angular shifting of the drum 1, the filled bag is brought towards the closing device and the next, empty bag takes its place. Immediately afterwards, the control spindle 179 that has brought the pawl 177 into engagement with the following ratchet tooth 176 at the end of the above described oscillation in the direction of the arrow F-21, executes a further oscillation in the direction of the arrow F-20, which has for its result to provide for a further cycle of operation as described, through a further movement that brings a further cylindrical perforation 173 into register with the stationary opening 174.

The above described machine is also equipped with a bag-closing device carrying the reference number 10 in Fig. 2. Said device includes, as illustrated in Figs. 25 to 29, two vertical control spindles 205 and 206 which are urged into a rocking movement round their axes by one of the camshafts of the machine and are guided in the bearings 207 and 208. The spindle 205 carries a crank arm 209 provided with a roller 210 engaging a groove in a slider 211 adapted to move along a slideway 212. Said slider 211 is connected through the links 213 with lateral jaws 214 rocking horizontally above the upper surface of the drum 1. Said jaws 214 are adapted to form inside the sidewalls of the bag and towards their upper ends, two reentrant folds 216 (Fig. 28).

The rocking spindle 206 controls a transmitting mechanism adapted to provide for the sliding in opposite directions and by equal amounts of two upper sliders 217 and 218 that are guided in perforations formed in two vertical walls 270 and 271 of the frame of the machine. The rocking spindle 206 carries a crank arm 273 provided with a knob 274 fitted inside a slot on a horizontal lever 222 adapted to oscillate round the pivot 281. Said lever 220 is also provided with two elongated slots 221, 222, in each of which is fitted a stud, such as 223, rigid with one of the sliders 217, 218 (Fig. 26). The slider 217 is rigid with a bent bar the end of which, adjacent to the drum, carries crimping impressions 227. On the other hand, the slider 218 is rigid with a bent bar carrying at its end adjacent to the drum crimping impressions 228 adapted to cooperate with the impressions 227 (Fig. 29).

This arrangement is associated with a further arrangement for laying and securing a label inside the upper end of the bag. The latter arrangement includes a roll or spool 230 (Fig. 25) round which is wound a cardboard strip 231 which serves for the production of the labels. Said strip 231 passes over a guiding roller 232 and it passes then downwardly between the driving claws 234, 235 of the mechanism providing for its progression that is controlled by a vertical reciprocating rod 236. The upper end of said rod 236 carries a transverse spindle 237, in a tapped perforation of which is screwed an adjusting rod 238; the latter engages a nut 239 carried at the end of a rocking lever 240, the rocking axis 241 of which lies in a bearing 242 mounted in the frame 243 of the machine. By reason of the obliquity of the roller 232 and of the claws 234 and 235 with reference to the radial plane of the drum passing through the axis of symmetry of the former 54 when it stops for closing the bag, the lower end of the strip 231 engages said bag substantially along the diagonal of the substantially square cross-section 100 thereof (Fig. 27). The claw 235 forms part of the bearing lever 244 of which the rocking axis 245 is mounted on a slider 246 mounted in the stationary slideway 247. The slider 246 carries the other claw 234. A tension spring 248 stretched between the bearing lever 244 and a stationary support 249 urges the claws 235 and 234 apart. The bearing lever 244 is connected through a pivot 250 with the rocking lever 240 that is provided with an elongated slot for the passage therethrough of said pivot 250.

The operation of the last mentioned arrangement is as follows: the filled bag, the substantially square cross-section of which is designated by the reference number 100, has now entered the position illustrated in Fig. 27. The rod 236 that executes its upward movement, causes the lever 240 to rock in the direction of the arrow F–27 round the axis 241, which has for its result to urge the claw 235 against the claw 234 through an oscillatory movement of the bearing lever 244. As the rod 236 continues its upward movement, the rocking of the lever 240 in the direction of the arrow F–27 produces a downward movement of the slider 246 which provides, in association with the claws 234, 235, for a downward movement of the strip 231 by the amount required for it to engage the inside of the bag through its open end slightly underneath the lateral jaws 214. As soon as this is achieved, the rod 236 begins its upward return movement and constrains the lever 240 to rock in the direction of the arrow F–28, which allows immediately the spring 248 to make the bearing lever 244 rock anti-clockwise, as seen in Fig. 25, whereby the claw 235 moves away from the claw 234 and releases thus the strip 231. The rod 236 continues its downward movement and the rocking of the lever 240 in the direction of the arrow F–28 has for its result to make the slider 246 rise along the slideway 247; the claws 234 and 235 occupy then a higher position in which they are adapted to again engage the strip 231 and make it sink by the desired amount inside the open end of a further bag in accordance with the above described cycle of operations.

The control spindle 205 rocks in the direction of the arrow F–22 whereby the lateral jaws 214 that rock round the stationary spindle 280 move nearer the radial plane of symmetry SS of the die 67 and form the reentrant folds 216 in the sides of the bag (Fig. 28) and, at the same time, they exert a slight pressure on the opposite surfaces of the lower end of the strip 231 that has been introduced through the open end of the bag, as illustrated in Fig. 28. This being done, the spindle 205 rocks in the direction of the arrow F–23 and produces thus a spacing apart of the jaws 214. The spindle 206 rocks in its turn in the direction of the arrow F–24 whereby the double acting lever 220 rocks in the direction of the arrow F–37 round its axis 281 so as to shift the slider 217 in the direction of the arrow F–25 and the slider 218 in the direction of the arrow F–26. This double movement brings the two crimping impresions 227 and 228 towards each other. The corresponding impressions engage the upper end of the longitudinal sides of the bag, urge them towards the plane of symmetry B–B of the latter as illustrated in Fig. 29, and urge them lastly over the opposite surfaces of the label 290 that has just been formed by cutting the strip 231 as provided by an oblique cutting blade 252 that is secured to the upper surface of the slider 218 and cooperates with a straight blade 253 carried by the outer slider 217. These blades 252 and 253 cut the strip 231 after the manner of sliding shears.

When the bags are finished and provided with their labels 290, they leave the closing device 10 as provided by the intermittent rotation of the drum 1; they are thus brought through a series of angular shiftings into the discharging station 260 (Fig. 2) where they find the delivery channel 261 communicating with the collecting box 262. An elastic blade 263 secured to a carrier member 264 projecting above the frame 2 has an operative part that is oblique with reference to the radial plane of symmetry of the plates 3 lying in register with the station 260. This spring blade 263 serves for damping the rocking of the bags 100 as they enter the station 260. A stationary oblique abutment 265 located underneath the drum 1 and illustrated in Figs. 3 and 5 cooperates with the tail end of the catch 70 so as to make it rock in the direction of the arrow F–30 round the spindle 72 so that said catch 70 may move the lower part of the bag 100 out of the bottom of the die 67. The associated operation of the catch 70 and of the oblique spring blade 263 releases completely the finished bags 100 from the dies 67 and causes them to drop into the exhaust channel 261.

The completely finished bag 100 provided with a reference label 290 is illustrated in perspective view as seen from below in Fig. 33. It assumes the general shape of a prismatic rod. The sidewalls are perforated as 301. The closing rib of the bag is designated by reference numeral 300.

What I claim is:

1. In a machine for making prismatic bags from thin metal blanks, for filling the bags with subdivided material and for closing same, the combination of a frame, a drum revolubly carried by said frame to rotate around a vertical axis registering with the axis of the drum, said drum being provided with a plurality of equidistant peripheral driving notches, a power unit, means controlled by said power unit and operatively engaging the notches to make the drum progress intermittently by angular shiftings equal to the spacing between two successive notches, a plurality of equidistant outwardly apertured vertical blank-folding dies distributed at the periphery of the drum in the intervals between the notches, angularly equidistant pairs of parallel vertical guiding plates radially rigid with said drum, the plates in each pair extending to either side of a corresponding die to carry same between them, each pair of plates including a horizontal slide, a vertically extending slider movably carried in each slideway, a vertical prismatic former vertically reciprocatable with reference to the corresponding slider, adapted to cooperate with each die for the folding of the blank, a carrier member for each former, means for feeding the blank to the die occupying a predetermined angular location in space, a vertically reciprocatable control bar associated with each pair of plates, means carried between the plates of each pair and adapted to convert the vertical movements of the associated control bar into horizontal reciprocatory movements of the corresponding slider and former, said carrier member and said control bar extending beyond the lower surface of the drum and including each a lower terminal laterally projecting section, two push members adapted to reciprocate vertically in register with a predetermined angular position assumed by the successive carrier members and control bars respectively between two successive angular shiftings of the drum and to operatively engage the projecting lower sections of the carrier member and of the control bar registering with them respectively and thereby shift the corresponding former into its operative position with reference to the die over the blank and a camshaft controlled by the power unit and controlling the push members.

2. In a machine for making prismatic bags having a substantially square cross-section, from a thin metal strip wound off a feed spool, for filling the bags with subdivided material and for closing same, the combination of a frame, a drum revolubly carried by said frame to rotate around a vertical axis registering with the axis of the drum, a power unit, means controlled by said power unit to make the drum progress intermittently by equal angular shiftings, a plurality of equidistant outwardly apertured vertical blank-folding dies distributed at the periphery of the drum, angularly equidistant pairs of parallel vertical guiding plates radially rigid with said drum, the plates in each pair extending to either side of a corresponding die to carry same between them, a vertical prismatic former having a substantially square cross-section, movable vertically and horizontally between and outside the plates of each pair and adapted to cooperate with the corresponding die for the folding of the blank, carrier means for each former, said carrier means being adapted to move horizontally and vertically with reference to the corresponding plates, means controlled by the power unit and controlling said carrier means as the drum stops in an angular position for which said carrier means and die occupy a predetermined position in space, means for cutting into rectangular blanks the thin strip wound off the feed spool and including a horizontal rectilinear track on which the strip is adapted to progress and provided with a terminal cutting edge perpendicular to the direction of progression of the strip over the track, said cutting edge being substantially parallel to a plane passing through the axis of the drum and through the longitudinal axis of the successive dies when occupying the above-mentioned position in space, means intermittently urging the strip over the track, a transfer frame adapted to receive the fore end of the strip progressing over the frame beyond the cutting edge of the track and to pivot round a horizontal axis parallel with the direction of progression of the strip, the rear end of said transfer frame cooperating with the said cutting edge, and means controlling the pivotal movement of the transfer frame from its horizontal strip-receiving position into a vertical position for which it urges the successive blank-forming terminal sections of the strip into engagement with the successive dies stopping transiently in the above-mentioned position in space.

3. In a machine for making prismatic bags from thin metal blanks, for filling the bags with subdivided material and for closing same, the combination of a frame, a drum revolubly carried by said frame to rotate round a vertical axis registering with the axis of the drum, a power unit, means controlled by said power unit to make the drum progress intermittently by equal angular shiftings, a plurality of equidistant outwardly apertured vertical blank-folding dies distributed at the periphery of the drum, angularly equidistant pairs of parallel vertical guiding plates radially rigid with said drum, the plates in each pair extending to either side of a corresponding die to carry same between them, a vertical prismatic former vertically and horizontally reciprocatable between the plates of each pair of plates and adapted to cooperate with the die for the folding of the blank, carrier means for each former adapted to move horizontally and vertically with reference to the corresponding plates, means controlled by the power unit and controlling said carrier means as the drum stops in an angular position for which said carrier means and die occupy a predetermined position in space, a horizontal rectilinear track, means for making the strip progress intermittently over said track by amounts corresponding to the breadth of the desired bag-forming blank to be cut out of the strip, adjustable means adapted to perforate the strip immediately ahead of the horizontal track and including a stationary perforated die plate, a punch carried to an adjustable level, by uprights adapted to be reciprocated by the power unit-controlled means, said punch being adapted to reciprocate in register with the perforations in said die plate and a manually operable adjusting mechanism adapted to vary said level of the punch on said uprights and the useful portion of its stroke, thereby allowing said punch to selectively engage and remain above said die plate and strip overlying same, means for cutting the thin strip into rectangular blanks in cooperation with the end of the horizontal track, means adapted to transfer the cut blank from the cutting means into the die in the drum for engagement with the cooperating former, when said die occupies the above-mentioned position in space.

4. In a machine for making prismatic bags, having a substantially square cross-section, from a thin metal blank cut out of a strip, for filling the bags with subdivided material and for closing same, the combination of a frame, a drum revolubly carried by said frame to rotate round a vertical axis registering with the axis of the drum, a power unit, means controlled by said power unit to make the drum progress intermittently by equal angular shiftings, a plurality of equidistant outwardly apertured vertical blank-folding dies distributed at the periphery of the drum, angularly equidistant pairs of parallel vertical guiding plates radially rigid with said drum, the plates in each pair extending to either side of a corresponding die to carry same between them, a vertical prismatic former having a substantially square cross-section, vertically and horizontally reciprocatable between and outside each pair of plates and adapted to cooperate with the corresponding die for the folding of the blank cut out of the strip, the lower end of said former having the shape of a hollow dihedral, carrier means for each former adapted to move horizontally and vertically between the corresponding plates, means controlled by the power unit and controlling said carrier means as the drum stops in angular positions for which the carrier means and the die lie in predetermined positions in space, means for cutting into rectangular blanks the thin strip and including a horizontal rectilinear track on which the strip is adapted to progress and provided with a terminal cutting edge perpendicular to the direction of progression of the strip over the track and substantially parallel with a plane passing through the axis of the drum in a predetermined angular direction, means for intermittently urging the strip over the track, means adapted to urge the strip into engagement with the cutting edge of the track and to lift the blanks thus cut out of the end of the strip into engagement with the successive dies stopping transiently in the above-mentioned plane for a first folding of the longitudinal sides of the bag by said die in cooperation with the corresponding former, a second folding device registering with a further plane passing through the axis of the drum, in which the successive dies stop and which is located beyond the first mentioned plane in the direction of progression of the drum, said second folding device being adapted to form a longitudinal closing rib including at least four strip thicknesses and extending throughout the length of the prismatic bag, a third folding device registering with a third plane passing through the axis of the drum and in which the successive dies stop, said third folding device being adapted to prepare the bottom of the bag and including a horizontal slideway, a slider reciprocatable in said slideway, two links and lateral jaws connected through said links with the slider and adapted to rock round stationary vertical axes carried by the machine frame, said lateral jaws being symmetrically located with respect to the third plane passing through the axis of the drum and the common center line of a former and blank-forming die registering with said third folding device upon stoppage of the drum between two successive shiftings, said jaws being adapted to make two symmetrical longitudinal grooves in opposite walls of the bag starting downwardly from the apex of said dihedral of the former, controlling means actuating last-mentioned slider, two further levers adapted to rock in a plane at right angles to the plane of oscillation of said lateral jaws, a slider carried by one of said further levers and including a folding bar and a shaping bar, a forming nose carried by the other further lever, a multislope rotary cam controlling said further levers and adapted when said lateral jaws have finished forming said grooves to gradually urge towards each other the lower end of the two non-grooved sides of the bag, the nose and the folding bar on said levers being adapted to fold back the four side walls together round the lower edge of said shaping bar, to prepare a reinforcing rib at the bottom of the bag.

5. In a machine as claimed in claim 4, the provision of a fourth folding device carried by the frame, registering with a position of stoppage of the successive dies beyond the three said planes passing through the axis of the drum and adapted to form a reentrant bottom of the bag, said fourth folding device comprising a substantially vertical slideway, an upper slider reciprocatable on said slideway, braking means for said slider, bottom finishing jaws pivotally secured to said upper slider, a lower slider on said slideways connected by links with said finishing jaws, a reciprocatable transmission rod controlling said lower slider, the rising stroke of the upper slider and the closing movement of said finishing jaws clamping and achieving said reinforcing rib by fashioning a reentrant bottom of the bag, the front outer surface of the finishing jaws tightly pressing the sides of said reentrant bottom together with the lower portion of the longitudinal closing rib against said hollow dihedral at the lower end of the corresponding former.

6. In a machine for making prismatic bags from thin metal blanks, for filling the bags with subdivided material and for closing same, the combination of a frame, a drum revolubly carried by said frame to rotate round a vertical axis registering with the axis of the drum, a power unit, means controlled by said power unit to make the drum progress intermittently by equal angular shiftings, a plurality of equidistant outwardly apertured vertical blank-folding dies distributed at the periphery of the drum, angular equidistant pairs of parallel vertical guiding plates radially rigid with said drum, the plates in each pair extending to either side of a corresponding die to carry same between them, a vertical prismatic former vertically and horizontally reciprocatable between and outside the plates of each pair of plates and adapted to cooperate with the die for the folding of the blank, carrier means for each former, adapted to move horizontally and vertically with reference to the corresponding plates, means for feeding a blank to each die entering predetermined positions in space, means controlled by the power unit and controlling said carrier means as the drum stops with the die lying in said predetermined position in space, means for filling the successive bags and a device for closing the filled bags, including a pair of rocking lateral claws lying above the die carrying the filled bag and adapted to form in the upper parts of the side walls of the bag two reentrant folds, a first vertical oscillating control shaft, a transmission including a crank arm, a slider and connecting links operatively connecting said first control shaft with said claws, a second vertical rocking control shaft, a transmission controlled by said second shaft, two sliders provided with associated crimping impressions controlled by last mentioned transmission and adapted to move in opposite directions with reference to one another to urge said crimping impressions to move to either side of a geometrical plane tangent to the cylinder generated by the vertical axis of symmetry of the bag carried along by the drum.

7. In a machine for making prismatic substantially square bags from thin metal blanks, for filling the bags with subdivided material and for closing same, the combination of a frame, a drum revolubly carried by said frame to rotate round a vertical axis registering with the axis of the drum, a power unit, means controlled by said power unit to make the drum progress intermittently by equal angular shiftings, a plurality of equidistant outwardly apertured vertical blank-folding dies distributed at the periphery of the drum, angularly equidistant pairs of parallel vertical guiding plates radially rigid with said drum, the plates in each pair extending to either side of a corresponding die to carry same between them, a vertical prismatic former vertically and horizontally reciprocatable between and outside the plates of each pair of plates, adapted to cooperate with the die for the folding of the blank, carrier means for each former, adapted to move horizontally and vertically with reference to the corresponding plates, means for feeding a blank to each die entering a predetermined position in space, means controlled by the power unit and controlling said carrier means as the drum stops with the die lying in said predetermined position in space, means for filling the successive bags and a device for closing the filled bags, including a pair of rocking lateral claws lying above the die carrying the filled bags, and adapted to form in the upper part of the side walls of the bag two reentrant folds, a first vertical oscillating control shaft, a transmission including a crank arm, a slider and connecting links operatively connecting said first control shaft with said claws, a second vertical rocking control shaft, a transmission controlled by said second shaft, two sliders provided with associated crimping impressions controlled by last mentioned transmission and adapted to move in opposite directions with reference to one another to urge said crimping impressions to move to either side of a geometrical plane tangent to the cylinder generated by the vertical axis of symmetry of the bag carried along by the drum, means for securing a label in the upper end of each bag, and including a spool, a strip of label-forming material wound over said spool, guiding means urging the free end of said strip into the upper end of the bag along a line that is oblique with reference to the square cross-section of the bag, means for cutting the strip at a predetermined height above the bag, the sliders provided with crimping impressions being adapted to produce corrugations simultaneously on the opposite sides of the bag and on the label, said label being thus held fast between the crimping corrugations with the interposition of said sides of the closed bag.

8. In a machine for making prismatic substantially square bags from thin metal blanks, for filling the bags with subdivided material and for closing same, the combination of a frame, a drum revolubly carried by said frame to rotate round a vertical axis registering with the axis of the drum, a power unit, means controlled by said power unit to make the drum progress intermittently by equal angular shiftings, a plurality of equidistant outwardly apertured vertical blank-folding dies distributed at the periphery of the drum, angularly equidistant pairs of parallel vertical guiding plates radially rigid with said drum, the plates in each pair extending to either side of a corresponding die to carry same between them, a vertical prismatic former vertically and horizontally reciprocatable between and outside the plates of each pair of plates adapted to cooperate with each die for the folding of the blank, carrier means for each former, adapted to move horizontally and vertically with reference to the corresponding plates, means for feeding a blank to each die entering a predetermined position in space, means controlled by the power unit and controlling said carrier means as the drum stops with the die lying in said predetermined position in space, means for filling the successive bags and a device for closing the filled bags, including a pair of rocking lateral claws lying above the die carrying the filled bags, and adapted to form in the upper part of the side walls of the bag two reentrant folds, a first vertical oscillating control shaft, a transmission including a crank arm, a slider and connecting links operatively connecting said first control shaft with said claws, a second vertical rocking control shaft, a transmission controlled by said second shaft, two sliders provided with associated crimping impressions controlled by last mentioned transmission and adapted to move in opposite directions with reference to one another to urge said crimping impressions to move to either side of a geometrical plane tangent to the cylinder generated by the vertical axis of symmetry of the bag carried along by the drum, means for securing a label in the upper end of each bag, and including a spool, a strip of label-forming material wound over said spool, guiding means for urging the free end of said strip into the upper end of the bag along a line that is oblique with reference to the square cross-section of the bag, means for cutting the strip at a predetermined height above the bag, including a cutting blade arranged on each of last-mentioned sliders obliquely with reference to the path of said sliders so as to progressively sever the label-forming strip, the sliders provided with crimping impressions being adapted to produce corrugations simultaneously on the opposite sides of the bag and on the label, said label being thus held fast between the crimping corrugations with the interposition of said sides of the closed bag.

9. In a machine for making prismatic bags having a substantially square cross-section, from thin metal strip wound off a feed spool, for filling the bags with subdivided material and for closing same, the combination of a frame, a drum revolubly carried by said frame to rotate round a vertical axis registering with the axis of the drum, a power unit, means controlled by said power unit to make the drum progress intermittently by equal angular shiftings, a plurality of equidistant outwardly apertured vertical blank-folding dies distributed at the periphery of the drum, angularly equidistant pairs of parallel vertical guiding plates radially rigid with said drum, the plates in each pair extending to either side of a corresponding die to carry same between them, a vertical prismatic former having a substantially square cross-section, movable vertically and horizontally between and outside the plates of each pair and adapted to cooperate with the corresponding die for the folding of the blank, carrier means for each former, said carrier means being adapted to move horizontally and vertically with reference to the corresponding plates, means controlled by the power unit and controlling said carrier means as the drum stops in an angular position for which said carrier means and die occupy a predetermined position in space, means for cutting into rectangular blanks the thin strip wound off the feed spool, means mounted on said frame for transferring said blanks onto the drum inside the successive dies for providing a first folding of three lateral walls of the bags to be fashioned in cooperation with the former, a device for operating a second folding of said blanks and forming a longitudinal closing rib throughout the length of the bag, a device for preparing the bottom of the bags, a device for finishing a reentrant bottom for the bag together with the formation of a reinforcing bottom rib, a device for filling the bags with the desired subdivided material, a device for closing the filled bags and a device for ejecting the closed filled bags out of the drum, said several devices being arranged on the frame in registration with corresponding successive angular positions of said rotary drum, and a yielding holding strip, tensioning rollers carried by said frame and adapted to urge yieldingly the holding strip over a portion of the periphery of said rotary drum through the length of an arc that is sufficient for holding laterally in the corresponding dies the bags passing through said devices for preparing and finishing a reentrant bottom, through said device for filling the bags and said device for closing the filled bags.

10. In a machine for making prismatic bags having a substantially square cross-section, from thin metal strip wound off a feed spool, for filling the bags with subdivided material and for closing same, the combination of a frame, a drum revolubly carried by said frame to rotate round a vertical axis registering with the axis of the drum, a power unit, means controlled by said power unit to make the drum progress intermittently by equal angular shiftings, a plurality of equidistant outwardly apertured vertical blank-folding dies distributed at the periphery of the drum, angularly equidistant pairs of parallel vertical guiding plates radially rigid with said drum, the plates in each pair extending to either side of a corresponding die to carry same between them, a vertical prismatic former having a substantially square cross-section, movable vertically and horizontally between and outside the plates of each pair adapted to cooperate with the corresponding die for the folding of the blank, carrier means for each former, said carrier means being adapted to move horizontally and vertically with reference to the corresponding plates, means controlled by the power unit and controlling said carrier means as the drum stops in an angular position for which said carrier means and die occupy a predetermined position in space, means for cutting into rectangular blanks the thin strip wound off the feed spool, blank-folding, bottom-forming, bag-filling and bag-closing devices arranged on the frame in registration with the corresponding successive angular positions of said drum, an oblique spring blade lying above the upper surface of the drum in register with the portion of the bags held in the dies inside the drum, a stationary cam for the delivery of the finished bags arranged obliquely with reference to the drum radius passing through it, said cam lying underneath the lower surface of said drum, the spring blade and the cam being located outside the portion of the drum periphery registering with said blank-folding, bottom-forming, bag-filling and bag-closing devices, a bag-extracting catch pivotally secured to the lower end of each die and including a tail end projecting beyond the lower surface of the drum to engage the edge of the oblique cam whereby the portion of the catch engaging the bag is adapted to rock outwardly of the drum to provide for the removal of the bag out of the die in cooperation with the oblique spring blade.

References Cited in the file of this patent

UNITED STATES PATENTS

| | | |
|---|---|---|
| Re. 20,881 | Rambold | Oct. 11, 1938 |
| 956,167 | Polland | Apr. 26, 1910 |
| 1,221,313 | Gwinn | Apr. 3, 1917 |
| 1,306,422 | Fossel | June 10, 1919 |